United States Patent
George et al.

(10) Patent No.: US 10,046,403 B2
(45) Date of Patent: Aug. 14, 2018

(54) SACRIFICIAL ELEMENT REMOVAL APPARATUS

(71) Applicant: Jaguar Land Rover Limited, Coventry (GB)

(72) Inventors: Nicholas George, Coventry (GB); Dale Sawyer, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 24 days.

(21) Appl. No.: 15/106,504

(22) PCT Filed: Dec. 22, 2014

(86) PCT No.: PCT/EP2014/078974
§ 371 (c)(1),
(2) Date: Jun. 20, 2016

(87) PCT Pub. No.: WO2015/092065
PCT Pub. Date: Jun. 25, 2015

(65) Prior Publication Data
US 2017/0001250 A1  Jan. 5, 2017

(30) Foreign Application Priority Data
Dec. 20, 2013 (GB) .................................. 1322642.8

(51) Int. Cl.
*B23D 33/02* (2006.01)
*B23D 19/08* (2006.01)
(Continued)

(52) U.S. Cl.
CPC ............ *B23D 19/08* (2013.01); *B23D 33/02* (2013.01); *B25J 11/0055* (2013.01); *B25J 15/0066* (2013.01)

(58) Field of Classification Search
CPC ............................... B23D 33/02; B23P 19/007
(Continued)

(56) References Cited

U.S. PATENT DOCUMENTS

| 769,081 A | 8/1904 | Hemington |
| 1,989,136 A | 3/1931 | Geggus |

(Continued)

FOREIGN PATENT DOCUMENTS

| DE | 20 2007 004 972 U1 | 9/2008 |
| DE | 10 2010 033 191 A1 | 2/2012 |

(Continued)

OTHER PUBLICATIONS

Combined Search and Examination Report, GB Application No. 1322642.8, dated Jun. 25, 2014, 8 pages.

(Continued)

*Primary Examiner* — Sean Michalski
*Assistant Examiner* — Fernando Ayala
(74) *Attorney, Agent, or Firm* — Myers Bigel, P.A.

(57) ABSTRACT

Apparatus is provided for removing a sacrificial element (16) from a body panel (2) of a motor vehicle during the assembly of the body structure of the motor vehicle. The apparatus comprises a cutter tool having a pair of cutter wheels (4, 5) defining a cutter gap (6) therebetween. Means (R) are provided for positioning the cutter tool (4, 5) so that the cutter gap (6) is aligned with the sacrificial element (16). The positioning means (R) can also move the cutter wheels (4, 5) relative to the sacrificial element (16). The engagement of the cutter wheels (3, 4) with the sacrificial element can cause the cutter wheels to rotate and cut the sacrificial element. A related method and cutter tool are also contemplated.

14 Claims, 5 Drawing Sheets

(51) Int. Cl.
*B25J 15/00* (2006.01)
*B25J 11/00* (2006.01)

(58) Field of Classification Search
USPC ......... 83/500, 495, 504, 505, 496, 498, 130, 83/923, 23, 112
See application file for complete search history.

(56) References Cited

U.S. PATENT DOCUMENTS

| | | | | |
|---|---|---|---|---|
| 2,052,519 | A * | 8/1936 | Smith | B26D 1/245 |
| | | | | 101/226 |
| 3,414,027 | A * | 12/1968 | Larva, Sr. | B27B 5/10 |
| | | | | 144/4.1 |
| 4,574,480 | A | 3/1986 | Dunn | |
| 5,067,338 | A | 11/1991 | Wilchynski | |
| 5,371,938 | A * | 12/1994 | Martin | B65B 69/0033 |
| | | | | 29/564.3 |
| 5,439,550 | A * | 8/1995 | Ballestrazzi | B29C 65/18 |
| | | | | 156/515 |
| 5,676,492 | A * | 10/1997 | Van Steijn | E02D 9/04 |
| | | | | 405/195.1 |
| 5,899,000 | A | 5/1999 | Break et al. | |
| 6,767,426 | B1 * | 7/2004 | Yamamoto | H01L 21/67092 |
| | | | | 156/267 |
| 7,007,729 | B1 * | 3/2006 | Landers | B27B 31/00 |
| | | | | 144/215.2 |
| 7,240,595 | B2 * | 7/2007 | Kato | B26D 7/14 |
| | | | | 83/175 |
| 7,975,582 | B1 * | 7/2011 | Coon | B23D 19/04 |
| | | | | 30/265 |
| 2002/0078805 | A1 * | 6/2002 | Hellenbrandt | B21C 47/34 |
| | | | | 83/13 |
| 2006/0070501 | A1 | 4/2006 | Hanks et al. | |
| 2008/0250835 | A1 * | 10/2008 | Hasegawa | B21D 39/021 |
| | | | | 72/220 |
| 2009/0084766 | A1 * | 4/2009 | Moritz | B23K 26/046 |
| | | | | 219/121.72 |
| 2010/0185315 | A1 * | 7/2010 | Schmidt | B25J 15/0019 |
| | | | | 700/160 |
| 2010/0319811 | A1 * | 12/2010 | Waterman | B08B 9/0808 |
| | | | | 147/1 |
| 2011/0126681 | A1 * | 6/2011 | Blanchet | B26D 1/24 |
| | | | | 83/51 |
| 2011/0290090 | A1 * | 12/2011 | Urabe | B25J 9/1682 |
| | | | | 83/23 |
| 2014/0028040 | A1 * | 1/2014 | Oda | B25J 15/083 |
| | | | | 294/115 |
| 2015/0020358 | A1 * | 1/2015 | Wu | B23K 26/083 |
| | | | | 29/407.01 |
| 2015/0258640 | A1 * | 9/2015 | Aubin | B23K 37/0276 |
| | | | | 228/9 |
| 2016/0158952 | A1 * | 6/2016 | Este | B65B 57/02 |
| | | | | 83/13 |

FOREIGN PATENT DOCUMENTS

| | | |
|---|---|---|
| GB | 270732 A | 9/1927 |
| GB | 696630 A | 9/1953 |
| GB | 892215 A | 3/1962 |
| WO | WO 84/01532 A1 | 4/1984 |
| WO | WO 95/26260 A1 | 10/1995 |

OTHER PUBLICATIONS

Notification of Transmittal of the International Search Report and the Written Opinion of the International Searching Authority, or the Declaration, PCT/EP2014/078974, dated Mar. 17, 2015, 13 pages.

* cited by examiner

SACRIFICIAL ELEMENT REMOVAL APPARATUS

RELATED APPLICATIONS

This application is a 35 U.S.C. § 371 national stage application of PCT Application No. PCT/EP2014/078974, filed on Dec. 22, 2014, which claims priority from Great Britain Patent Application No. 1322642.8 filed on Dec. 20, 2013, the contents of which are incorporated herein by reference in their entireties. The above-referenced PCT International Application was published in the English language as International Publication No. WO 2015/092065 A1 on Jun. 25, 2015.

TECHNICAL FIELD

The present invention relates to an apparatus for, and a method of, removing a sacrificial element from a body panel of a motor vehicle.

BACKGROUND

During fabrication of the body structure of a motor vehicle (referred to as the body-in-white), a multitude of panels and braces are attached to a floor structure (or floor pan) assembly. The floor structure forms the base on which the body structure is assembled. Typical techniques for attaching the panels to the floor structure include welding, bonding and mechanical fasteners (such as threaded fasteners or rivets). As the floor structure moves down the assembly line, held in place by clamping fixtures, the body structure of the vehicle is assembled. This fabrication process is commonly partially or completely automated, for example utilising of robotic arms located at a series of stations along the assembly line to perform programmed tasks as the body structure travels along the line. The robotic arms are fitted with one or more tools for performing the requisite tasks at each station. The assembly process lends itself to the use of robotic arms because articulating arms can easily introduce various component braces and panels to the floor structure and perform a high number of operations in a short time frame and with a high degree of accuracy.

There are various stages in the production process where panels must be accurately aligned and joined to each other. For example, when the left and right side panels are located in relation to the floor structure and then secured in place, for example by welding or riveting. In order to ensure accurate assembly, the panels must be precisely located before they are joined. This can be accomplished using a sacrificial element which defines a reference (datum) point for locating the panel. The sacrificial element can, for example, take the form of a sacrificial strap extending across a corner of an aperture formed in the side body panel, or a sacrificial tab extending along an edge of an aperture. The sacrificial element is typically formed integrally with the panel and can comprise an alignment aperture which defines the datum point. Once the panel has been aligned, the panel can be fixed in place, for example to the floor structure and roof, by welding or riveting. The sacrificial element is subsequently removed from the panel. Typically, this has been done manually, for example using a pneumatic nibbler. However, this method of removing the sacrificial element is dependent upon the skill of an operator to ensure a satisfactory finish. The use of a pneumatic nibbler can potentially also result in the operator getting "white finger" caused by the mechanical vibration.

It is against this backdrop that the present invention has been conceived. At least in certain embodiments, aspects of the present invention seek to overcome or ameliorate problems associated with the prior art apparatus and methods.

SUMMARY OF THE INVENTION

Aspects of the present invention relate to apparatus for, and a method of, removing a sacrificial element from a body panel of a motor vehicle. According to a further aspect of the present invention there is provided a cutter tool, and a manipulator.

According to a further aspect of the present invention there is provided an apparatus for removing a sacrificial element from a body panel of a motor vehicle during the assembly of a body structure of the motor vehicle, the apparatus comprising a cutter tool having a pair of cutter wheels defining a cutter gap therebetween, means for positioning the cutter tool so that the cutter gap is aligned with the sacrificial element, and means for moving the cutter tool relative to the sacrificial element to cut the sacrificial element. In use, the cutter tool operates to cut the sacrificial element from the remainder of the body panel allowing the sacrificial element to be removed for disposal. The body panel and the sacrificial element are formed from a sheet material and, in use, the cutter wheels can be positioned such that the sheet material is aligned with the cutter gap formed between the cutter wheels.

The cutter tool can be configured such that, when the cutter tool moves relative to the sacrificial element, the engagement of the cutter wheels with the sacrificial element causes the cutter wheels to rotate and cut the sacrificial element.

The cutter wheels can have complementary shearing surfaces which define a stepped cutter gap.

The apparatus can further comprise a respective cutter shaft for each cutter wheel. The cutter wheels are mounted to the respective cutter shafts or are formed integrally with the respective cutter shafts. The cutter shafts each define an axis about which the respective cutter wheel can rotate. In use, the axes of the cutter shafts can be arranged substantially parallel to each other. During a cutting operation, the axes of the cutter shafts can be arranged substantially parallel to the respective surfaces of the sacrificial element. Thus, the cutter wheels are arranged, in use, to rotate about axes arranged substantially parallel to the surfaces of the material to be cut.

The apparatus can further comprise gearing between the cutter shafts, the gearing being such that the cutter wheels are constrained to rotate in opposite directions.

At least in certain embodiments, the cutter tool can be moved to perform the cutting operation while the sacrificial element (or the structure from which the sacrificial element is being removed) remains stationary. The means for positioning the cutter tool and/or the means for moving the cutter tool can comprise a manipulator. The cutter tool can be mounted to the manipulator for positioning and/or moving the cutter tool relative to the sacrificial element. The manipulator can be adapted to move the cutter tool in one, two or three planes. The manipulator can be adapted to rotate the cutter tool about one, two or three axes. The manipulator can be computer controlled, for example by a control unit containing one or more programmable processors. The manipulator can be an articulated arm or other robotic arm. The manipulator can be adapted to perform one or more assembly operations.

The cutter tool can further comprise a gripper assembly for gripping the sacrificial element. The gripper assembly can be disposed adjacent to the cutter tool.

The gripper assembly can comprise a pair of grippers, each of which is supported by a respective gripper arm. The grippers can each take the form of a wheel rotatably mounted on said gripper arms. The wheels can engage respective sides of the sacrificial element. A drive mechanism can selectively engage/release said gripper assembly. The drive mechanism can be configured to pivot said gripper arms. The gripper arms can pivot into gripping engagement with the sacrificial element before or after the cutting operation has commenced.

In arrangements in which the cutter tool is mounted to a manipulator, the manipulator can be configured to retract the cutter tool once the cutting operation has been completed to transport the sacrificial element away from the body panel. For example, the gripper assembly can retain the sacrificial element and deposit it in a collection bin.

The manipulator can be configured to displace the cutter tool a sufficient distance beyond the sacrificial element such that, if the cutting operation has not completely cut the sacrificial element, the gripper assembly travels out of engagement with the sacrificial element. Thus, retraction of the cutter tool does not result in the sacrificial element being carried away from the body panel.

According to a further aspect of the present invention there is provided a cutter tool comprising a pair of cutter wheels defining a cutter gap therebetween for receiving a sheet material, the cutter wheels being arranged to applying a shearing force when the cutter tool is displaced relative to the sheet material.

One or both of the cutter wheels could be driven, for example by an electric motor or a pneumatic motor. Alternatively, at least one of said cutter wheels can be freely rotatably mounted. In certain embodiments, neither of said cutter wheels is driven. Thus, the cutter wheels can rotate freely. When both of the cutter wheels can rotate freely, the rotational speed of the cutter wheels can more readily match the displacement speed of the cutter tool relative to the sheet material.

The cutter tool can be configured such that, when the cutter tool is moved relative to the sheet material, the engagement of the cutter wheels with the sheet material causes the cutter wheels to rotate and cut the sheet material. The cutter wheels can have complementary shearing surfaces. The shearing surface can define a stepped cutter gap.

The cutter wheels can be mounted to respective cutter shafts. At least in certain embodiments, the axes of the cutter shafts can be arranged substantially parallel to each other. Gearing can optionally be provided between the cutter shafts. The gearing can be configured such that the cutter wheels are constrained to rotate in opposite directions.

The cutter tool can include a gripper assembly for gripping a cut portion of said sheet material. The gripper assembly can comprise a pair of grippers, each of which is supported by a respective pivotally mounted gripper arm. The grippers can be arranged to engage opposite sides of the sheet material.

Apparatus for cutting a sheet material can comprise the combination of the cutter tool described herein with a manipulator for moving the cutter tool relative to the sheet material. The manipulator can be operatively configured to displace the cutter tool relative to the sheet material such that engagement of the cutter wheels with the sheet material causes the cutter wheels to rotate and cut the sheet material. The manipulator can, for example, comprise an articulated robotic arm.

A further aspect of the invention relates to a method of removing a sacrificial element from a body panel of a motor vehicle during the assembly of a body structure of the motor vehicle, the method comprising the steps of aligning a cutter tool having a pair of cutter wheels defining a cutter gap with the sacrificial element, and moving the cutter tool relative to the sacrificial element to cut the sacrificial element. The cutter wheels engage opposite sides of the sacrificial element and apply a shearing force to cut the sacrificial element. The engagement of the cutter wheels with the sacrificial element can cause the cutter wheels to rotate and cut the sacrificial element when the cutter tool moves relative to the sacrificial element.

The cutter tool can be mounted to a manipulator. The method can comprise operating the manipulator to move the cutter tool relative to the sacrificial element to cut the sacrificial element.

The cutter tool can comprise a gripper assembly. The method can comprise gripping the sacrificial element using said gripper assembly. The gripper assembly can comprise a pair of grippers, each of which is supported by a respective pivotally mounted gripper arm. The method can comprise the step of pivoting the grippers into gripping engagement with the sacrificial element after the cutting operation has commenced.

The cutter tool can be retracted after the cutting operation has been completed to remove the sacrificial element. The method can include displacing the cutter tool a sufficient distance beyond the sacrificial element such that, if the cutting operation has not completely cut the sacrificial element, the gripper assembly travels out of engagement with the sacrificial element so that retraction of the cutter tool does not attempt to carry the sacrificial element away from the body panel. The gripper assembly can be operated to grip the sacrificial element after the cutting operation has commenced.

The method can further comprise the step of gearing the cutter wheels so that the cutter wheels are constrained to rotate in opposite directions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
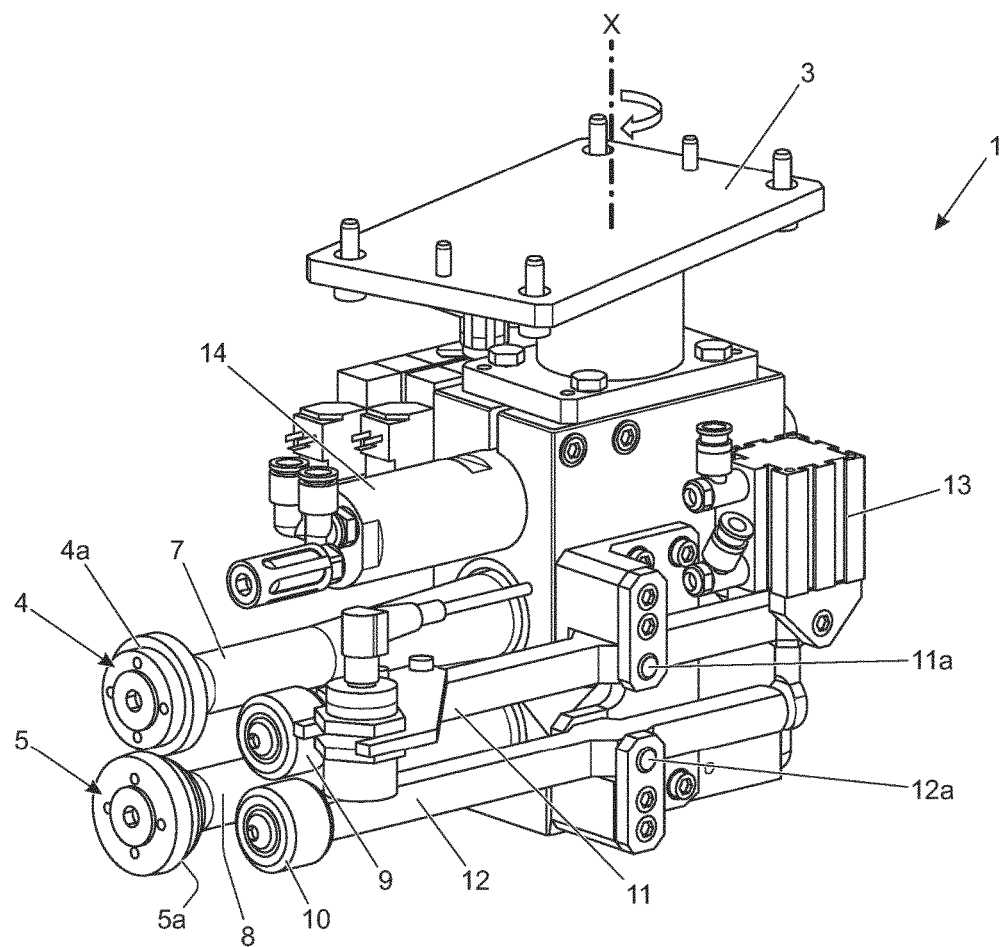
FIG. 1 is a perspective view of a cutter tool for removing a sacrificial element from a body panel of a motor vehicle in accordance with an embodiment of the present invention.

A cutter tool 1 for mounting to an automated manipulator in accordance with an aspect of the invention is shown in FIG. 1. The cutter tool 1 is adapted to remove a sacrificial element from a panel.

Figure 2:
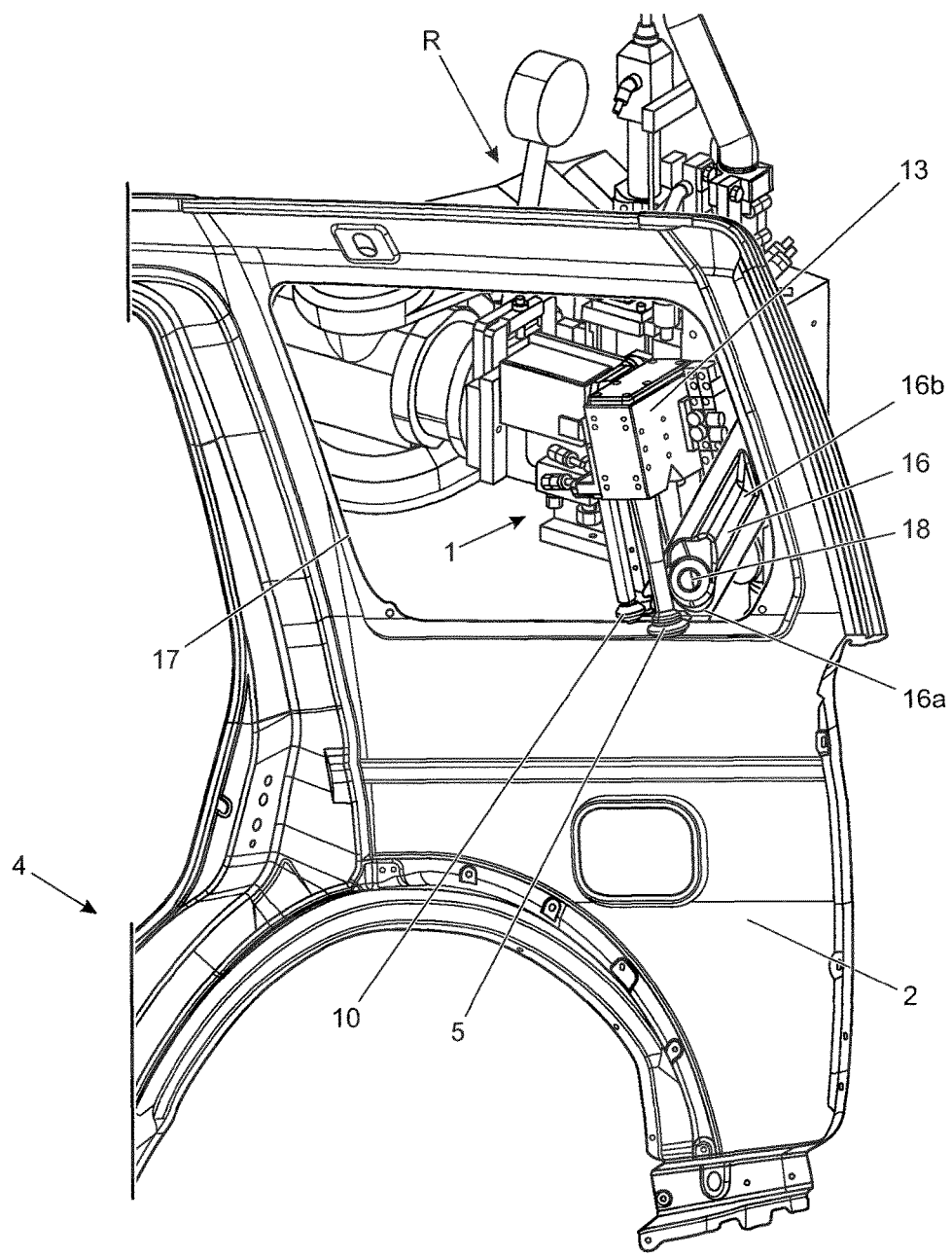
FIG. 2 is a perspective view of a robotic arm and the cutter tool of FIG. 1, showing the initial interaction of the cutter tool with a sacrificial strap provided in a window opening of a motor vehicle side body panel.
Figure 3:
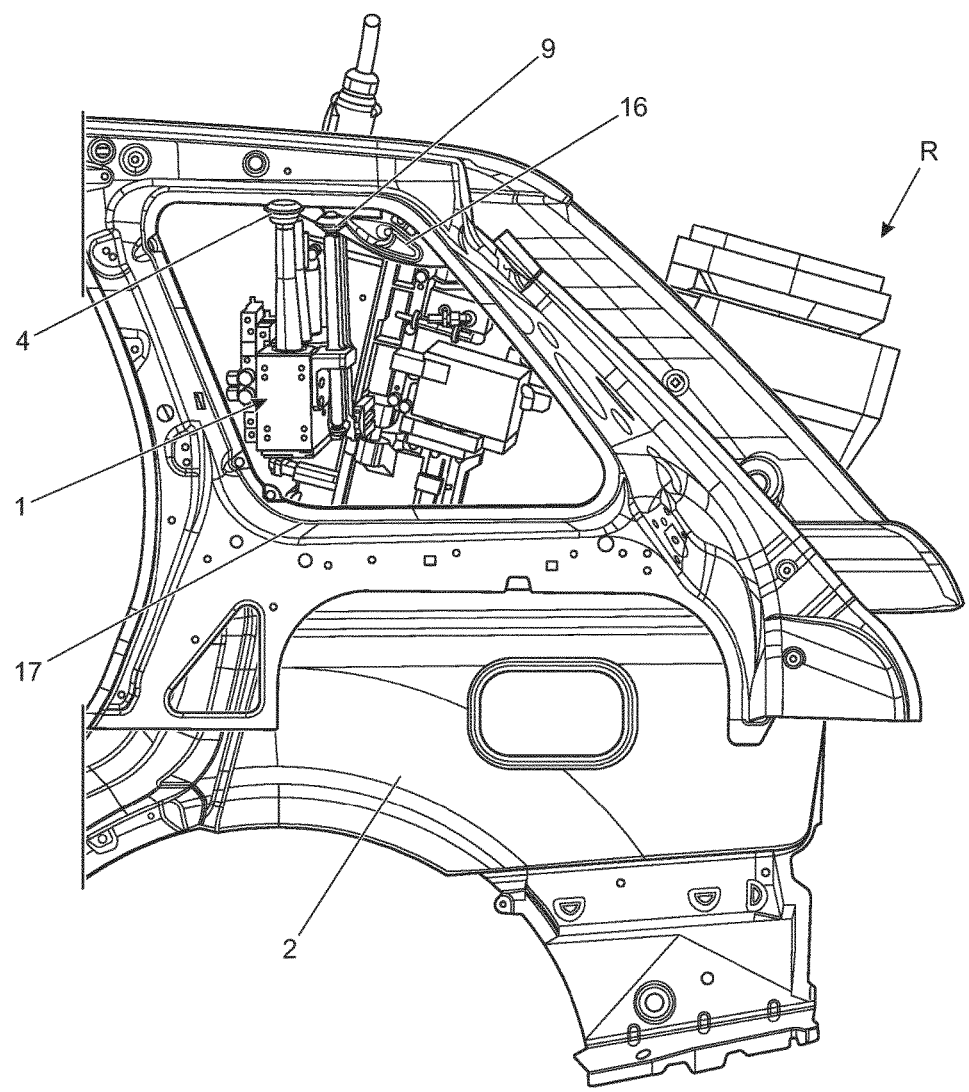
FIG. 3 is a perspective view of a vehicle with a sacrificial element, similar to that of FIG. 2, showing the final interaction of the apparatus with the sacrificial strap.

In the present embodiment, the automated manipulator is in the form of an articulated robotic arm R for use in a motor vehicle assembly line to perform operations during the assembly of a body structure of a motor vehicle (the body-in-white). A control unit (not shown) including a programmable processor is provided to control operation of the robotic arm R. The robotic arm R is programmed to perform operations on a side body panel 2 of the body structure, as shown in FIGS. 2 and 3. The robotic arm R has multiple degrees of freedom (typically 7) to enable the cutter tool 1 to be manipulated in 3-dimensions. The robotic arm R also carries a welding head (not shown) to perform spot welding on the body structure. The cutter tool 1 and the welding head are interchangeable allowing the robotic arm R to engage an appropriate tool to perform different operations.

Figure 4:
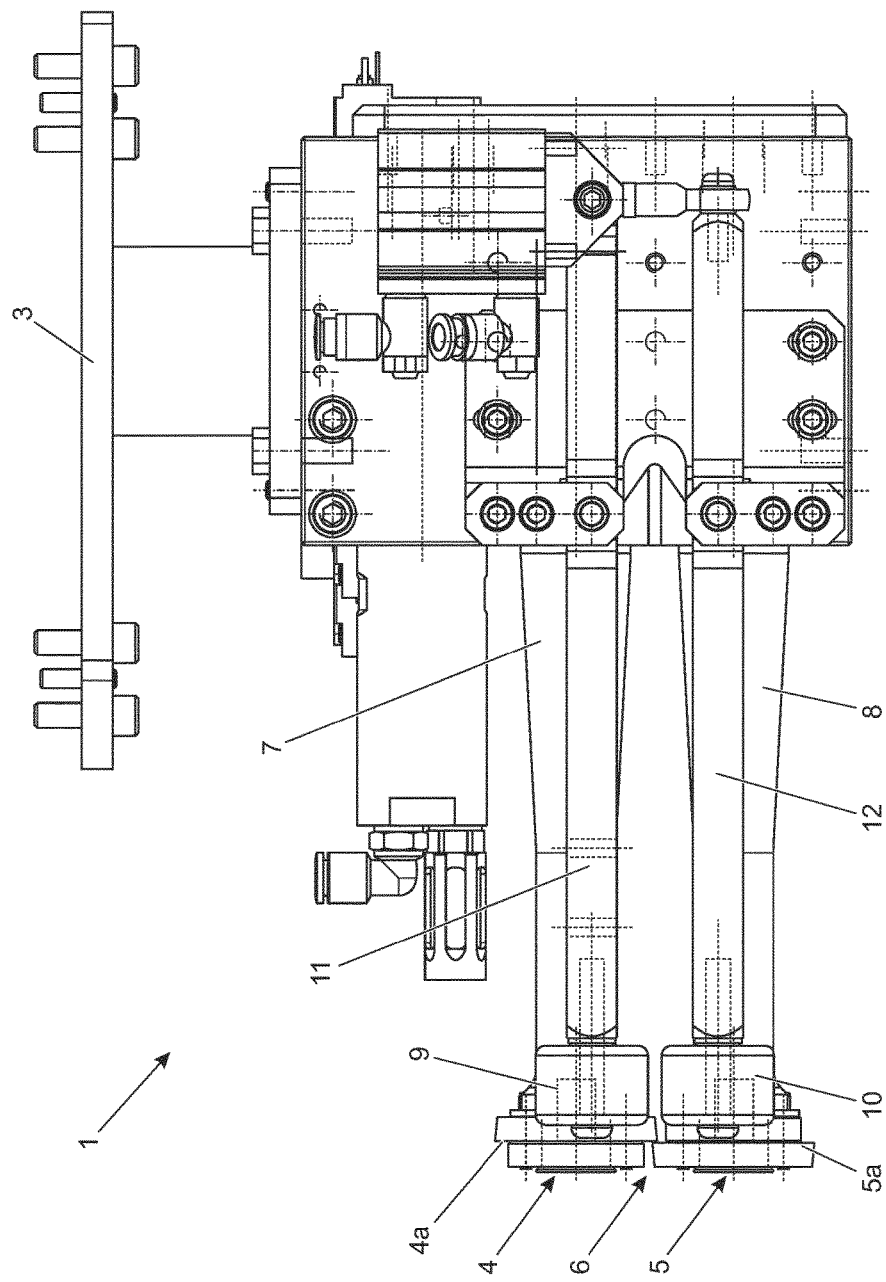
FIG. 4 is a side elevation of the cutter tool shown in FIG. 1.
Figure 5:
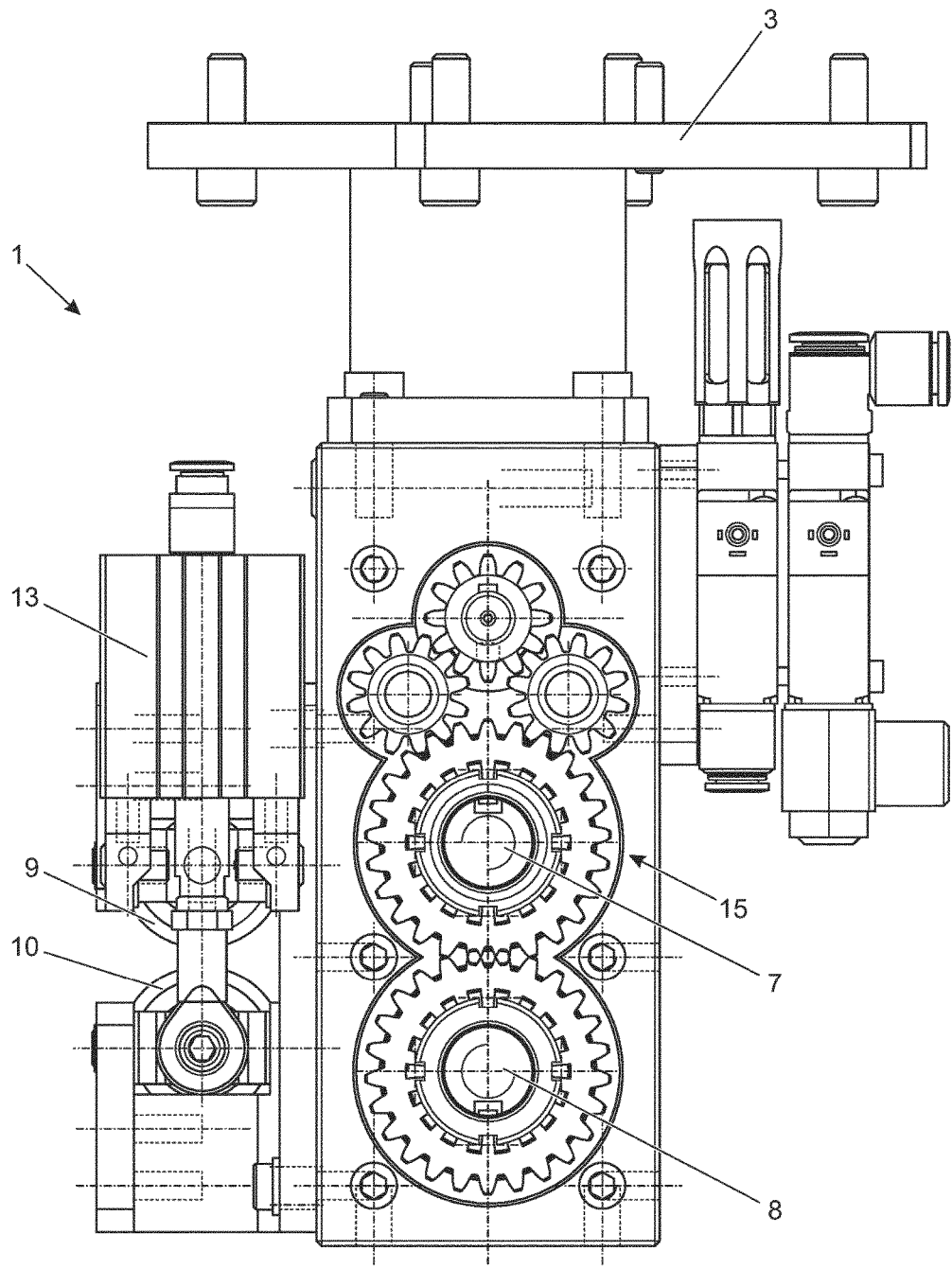
FIG. 5 is a rear elevation of the cutter tool shown in FIG. 1.

A mounting plate 3 is provided for mounting the cutter tool 1 to the robotic arm R. The cutter tool 1 is rotatable relative to the mounting plate 3 about a longitudinal axis X to facilitate alignment with the body panel 2. The cutter tool 1 includes a pair of cutter wheels 4, 5, the cutter wheels having complementary shearing surfaces 4a, 5a which define a stepped shearing gap 6, as shown in FIG. 4. The cutter wheels 4, 5 are mounted on respective shafts 7, 8 which are mounted to the cutter tool 1 so as to be freely rotatable relative thereto. The shafts 7, 8 are coupled to taper roller bearings and a gear train 15 so that rotation of the two cutter wheels 4, 5 occurs in opposite directions. As shown in FIG. 5, the gear train 15 provides a driving connection between the shafts 7, 8 such that the cutter wheels 4, 5 rotate at the same speed, albeit in opposite directions. In an alternate arrangement, the gear train 15 could be omitted and the cutter wheels 4, 5 allowed to rotate freely. A drive motor 14 is illustrated in the figures for drivingly rotating said shafts 7, 8 via the gear train 15. However, it has been found that the drive motor 14 is not essential to the cutting operation and could be omitted.

The cutter tool 1 also comprises first and second opposable grippers 9, 10 mounted on respective gripper arms 11, 12. In the present embodiment, the first and second grippers 9, 10 are in the form of rotatable wheels having a gnarled outer surface for engaging the sacrificial element to be removed. The first and second grippers 9, 10 are disposed adjacent to the cutter wheels 4, 5. Each gripper arm 11, 12 is pivotally mounted (at pivot points 11a, 12a respectively) to a drive mechanism 13 which comprises an actuator (not shown). The drive mechanism 13 is configured to pivot the grippers 9, 10 towards and away from one another between respective engaged and released positions.

The cutter tool 1 is adapted to remove a sacrificial element 16 which in the present embodiment is a strap 16 formed integrally with the side body panel 2. The strap 16 extends across a corner of a window opening 17, defining first and second connecting parts 16a, 16b separated from each other by a corner aperture. The strap 16 is used to align the side body panel 2 and comprises an alignment aperture 18 for receiving a complementary alignment member disposed on an assembly jig. During the assembly process, the alignment aperture 18 provides a reference point for aligning the side body panel 2 with a floor structure and roof (not shown) before being welded in place to form the body structure. Once the side body panel 2 is secured within the body structure, the strap 16 is no longer required as other reference points are available to align the body structure (for example, one or more reference points can be defined by fixing points in the floor structure).

The operation of the cutter tool 1 to remove the sacrificial strap 16 will now be described with reference to FIGS. 2 and 3. The strap 16 is sheared in two cutting operations, the first cutting operation shears the first part 16a, and the second cutting operation shears the second part 16b. FIG. 2 shows the cutter tool 1 approaching the first part 16a to commence the first cutting operation, and FIG. 3 shows the cutter tool 1 cutting through the second part 16b during the second cutting operation. The robotic arm R is controlled to move the cutter tool 1 relative to the body side panel 2; the body side panel 2 remains stationary during the first and second cutting operations. In arrangements which do not utilise the drive motor 14, the shafts 7, 8 can rotate freely to allow the cutter wheels 4, 5 to rotate at a speed proportional to the speed at which the cutter tool 1 is transported relative to the sacrificial element 16.

The robotic arm R is controlled so that the first and second cutter wheels 4, 5 are aligned perpendicular to the respective surfaces of the strap 16. The cutter tool 1 is oriented such that the cutter wheels 4, 5 are in front of the first and second grippers 9, 10 so that the tool 1 can be advanced to engage the first part 16a between the cutter wheels 4, 5. The robotic arm R provides a driving force to displace the tool 1 relative to the side body panel 2. As the cutters 4, 5 engage the first part 16a, they rotate in opposite directions owing to their rolling motion with respect to the strap as the entire cutter/gripper assembly is driven around the strap. The strap part 16a is, therefore, gripped in the shearing gap 6 defined between the cutter wheels 4, 5. The continued movement of the cutter tool 1 relative to the side body panel 2 (under the driving action of the robotic arm R) results in the shearing of the sheet metal disposed between the cutter wheels 4, 5. As the strap part 16a is sheared the grippers 9, 10 are held in an open position so as not to engage with the strap.

Once the first cutting operation has been completed, the cutter tool 1 is realigned in the corner aperture disposed between the first and second parts 16a, 16b. The robotic arm R then advances the cutter tool 1 to engage the second part 16b between the cutter wheels 4, 5. As the cutter wheels 4, 5 engage the surface of the second part 16b, the grippers 9, 10 are pivoted inwardly by the drive mechanism 13 to their engaged position so as to grip that part of the strap. The robotic arm R continues to displace the cutter tool 1 relative to the side body panel 2 such that the cutter wheels 4, 5 complete the second cutting operation. The grippers 9, 10 rotate over the surface of the second part 16b as the cutter wheels 4, 5 advance. Once the second cutting operation is completed, the strap 16 is no longer attached to the side body panel 2, but is held between the grippers 9, 10. To dispose of the strap 16, the robotic arm R retracts the tool 1 away from the body structure. The tool 1 is positioned over a chute (not shown) and the grippers 9, 10 are opened to release the strap 16 into a collection bin (not shown).

The control unit is configured to control the robotic arm R to ensure that the cutter wheels 4, 5 have travelled well beyond the second strap part 16b before the tool 1 is retracted to carry the strap 16 away from the side body panel 2. In particular, the control unit controls the robotic arm R to move the tool 1 sufficiently far beyond the strap 16 that the grippers 9, 10 have travelled beyond the original extent of the strap 16. Thus, should the shearing action be incomplete, the grippers 9, 10 are out of gripping engagement with the strap 16, so that the subsequent retraction of the tool 1 does not pull the partly-severed strap 16 away from the side body panel 2. Thus, in the event that either the first or second cutting operation is not completed, the grippers 9, 10 are displaced beyond the strap 16 to release it from the gripping assembly. The partly-severed strap 16 can be left in position for manual removal.

The invention has been described with reference to the sacrificial strap 16 extending across the corner of the opening 17. It will be appreciated that the sacrificial element 16 can take other forms. For example, the sacrificial element can be a sacrificial tab or protuberance, for example provided to align the roof with the side body panels 2. Rather than provide an alignment function, the sacrificial element could act as a reinforcing member to facilitate handling of the panel.

It will be apparent that modifications could be made to the apparatus and method described above.

Further aspects of the apparatus and method described herein will be apparent from the following numbered paragraphs:

1. Apparatus for removing a sacrificial element from a body panel of a motor vehicle during the assembly of a body structure of the motor vehicle, the apparatus comprising a cutter tool having a pair of cutter wheels defining a cutter gap therebetween, positioning apparatus for positioning the cutter tool so that the cutter gap is aligned with the sacrificial element, and movement apparatus for moving the cutter tool relative to the sacrificial element to cut the sacrificial element.

2. Apparatus as described in paragraph 1, wherein the cutter tool is configured such that, when the cutter tool moves relative to the sacrificial element, the engagement of the cutter wheels with the sacrificial element causes the cutter wheels to rotate and cut the sacrificial element.

3. Apparatus as described in paragraph 1, wherein the cutter wheels have complementary shearing surfaces which define a stepped cutter gap.

4. Apparatus as described in paragraph 1, wherein the cutter wheels are mounted to respective cutter shafts, the axes of the cutter shafts being arranged substantially parallel to each other.

5. Apparatus as described in paragraph 4 comprising gearing between the cutter shafts, the gearing being such that the cutter wheels are constrained to rotate in opposite directions.

6. Apparatus as described in paragraph 1, wherein the cutter tool comprises a gripper assembly for gripping the sacrificial element and for removing the sacrificial element after the cutting operation.

7. Apparatus as described in paragraph 6, wherein the gripper assembly comprises a pair of grippers, each of which is supported by a respective pivotally mounted gripper arm.

8. Apparatus as described in paragraph 7, wherein the gripper assembly is configured to pivot the grippers into gripping engagement with the sacrificial element after the cutting operation has commenced.

9. Apparatus as described in paragraph 6, wherein the gripper assembly is configured to retain the sacrificial element once it has been completely cut from the body panel.

10. Apparatus as described in paragraph 1, wherein the movement apparatus comprises a manipulator, such as an articulated arm.

11. Apparatus as described in paragraph 10, wherein the manipulator is configured to retract the cutter tool once the cutting operation has been completed to remove the sacrificial element.

12. Apparatus as described in paragraphs 6 and 10, wherein the manipulator is configured to displace the cutter tool a sufficient distance beyond the sacrificial element such that, if the cutting operation has not completely cut the sacrificial element, the gripper assembly travels out of engagement with the sacrificial element so that retraction of the cutter tool does not attempt to transport the sacrificial element away from the body panel.

13. A cutter tool for mounting to a manipulator, the cutter tool comprising a pair of cutter wheels defining a cutter gap therebetween for receiving a sheet material, the cutter wheels being arranged to applying a shearing force when the cutter tool is displaced relative to the sheet material.

14. A cutter tool as described in paragraph 13, wherein at least one of said cutter wheels is freely rotatably mounted; and/or at least one of said cutter wheels is driven.

15. A cutter tool as described in paragraph 13, wherein the cutter tool is configured such that, when the cutter tool is moved relative to the sheet material, the engagement of the cutter wheels with the sheet material causes the cutter wheels to rotate and cut the sheet material.

16. A cutter tool as described in paragraph 13, wherein the cutter wheels have complementary shearing surfaces which define a stepped cutter gap.

17. A cutter tool as described in paragraph 13, wherein the cutter wheels are mounted to respective cutter shafts, the axes of the cutter shafts being arranged substantially parallel to each other.

18. A cutter tool as described in paragraph 17 comprising gearing between the cutter shafts, the gearing being such that the cutter wheels are constrained to rotate in opposite directions.

19. A cutter tool as described in paragraph 13 comprising a gripper assembly for gripping a cut portion of said sheet material.

20. A cutter tool as described in paragraph 19, wherein the gripper assembly comprises a pair of grippers, each of which is supported by a respective pivotally mounted gripper arm.

21. A manipulator in combination with a cutter tool as described in paragraph 13, wherein the manipulator is operatively configured to displace the cutter tool relative to the sheet material such that engagement of the cutter wheels with the sheet material causes the cutter wheels to rotate and cut the sheet material.

22. A method of removing a sacrificial element from a body panel of a motor vehicle during the assembly of a body structure of the motor vehicle, the method comprising the steps of aligning a cutter tool having a pair of cutter wheels defining a cutter gap therebetween with the sacrificial element, and moving the cutter tool relative to the sacrificial element to cut the sacrificial element.

23. A method as described in paragraph 22, wherein the engagement of the cutter wheels with the sacrificial element causes the cutter wheels to rotate and cut the sacrificial element when the cutter tool moves relative to the sacrificial element.

24. A method as described in paragraph 22, wherein the cutter tool is mounted to a manipulator and the method comprises operating the manipulator to move the cutter tool relative to the sacrificial element to cut the sacrificial element.

25. A method as described in paragraph 22 comprising the step of gripping the sacrificial element using a gripper assembly, and retracting the gripper assembly after the cutting operation has been completed to remove the sacrificial element.

26. A method as described in paragraph 25, wherein the cutter tool is displaced a sufficient distance beyond the sacrificial element such that, if the cutting operation has not completely cut the sacrificial element, the gripper assembly travels out of engagement with the sacrificial element so that retraction of the cutter tool does not attempt to carry the sacrificial element away from the body panel.

27. A method as described in paragraph 25, comprising the step of actuating the gripper assembly to grip the sacrificial element after the cutting operation has commenced.

28. A method as described in paragraph 22 comprising the step of gearing the cutter wheels so that the cutter wheels are constrained to rotate in opposite directions.

The invention claimed is:

1. An apparatus for removing a sacrificial element from a body panel of a motor vehicle during the assembly of a body structure of the motor vehicle, the apparatus comprising:
  a cutter tool having a pair of cutter wheels, the cutter tool further comprising a gripper assembly for gripping the sacrificial element and transporting the sacrificial element away from the body panel after a cutting operation;
  a manipulator configured to position the cutter tool and to move the cutter tool relative to the sacrificial element to cut the sacrificial element; and
  a control unit,
  wherein the gripper assembly comprises first and second rotatable wheels for engaging the sacrificial element, and
  wherein, in use, the control unit is configured to control the manipulator to displace the cutter tool a sufficient distance beyond the sacrificial element such that, if the cutting operation has not completely cut the sacrificial element, the first and second wheels of the gripper assembly travel out of engagement with the sacrificial element so that subsequent retraction of the cutter tool does not attempt to transport the sacrificial element away from the body panel.

2. The apparatus of claim 1, wherein the cutter tool is configured such that, when the cutter tool moves relative to the sacrificial element, the engagement of the cutter wheels with the sacrificial element causes the cutter wheels to rotate and cut the sacrificial element.

3. The apparatus of claim 1, wherein the cutter wheels have complementary shearing surfaces.

4. The apparatus of claim 1, wherein the cutter wheels are mounted to respective cutter shafts, and wherein respective axes of the cutter shafts are parallel to each other.

5. The apparatus of claim 4, further comprising gearing between the cutter shafts that constrains the cutter wheels to rotate in opposite directions.

6. The apparatus of claim 1, wherein the gripper assembly comprises a pair of grippers, each of which is supported by a respective pivotally mounted gripper arm.

7. The apparatus of claim 6, wherein the gripper assembly pivots the grippers into gripping engagement with the sacrificial element after the cutting operation has commenced.

8. The apparatus of claim 1, wherein the gripper assembly retains the sacrificial element once the sacrificial element has been completely cut from the body panel.

9. The cutter tool of claim 1, wherein at least one of the cutter wheels is freely rotatably mounted.

10. The cutter tool of claim 1, wherein at least one of the cutter wheels is driven.

11. A method of removing a sacrificial element from a body panel of a motor vehicle during the assembly of a body structure of the motor vehicle, the method comprising:
  aligning a cutter tool with the sacrificial element, the cutter tool having a pair of cutter wheels and further comprising a gripper assembly comprising first and second rotatable wheels for engaging the sacrificial element;
  moving the cutter tool relative to the sacrificial element to cut the sacrificial element;
  gripping the sacrificial element with the gripper assembly; and
  displacing the cutter tool a sufficient distance beyond the sacrificial element such that, if the cutting operation has not completely cut the sacrificial element, the first and second wheels of the gripper assembly travel out of engagement with the sacrificial element so that subsequent retraction of the cutter tool does not attempt to transport the sacrificial element away from the body panel.

12. The method of claim 11, wherein the engagement of the cutter wheels with the sacrificial element causes the cutter wheels to rotate and cut the sacrificial element when the cutter tool moves relative to the sacrificial element.

13. The method of claim 11, wherein the cutter tool is mounted to a manipulator, and wherein the method further comprises operating the manipulator to move the cutter tool relative to the sacrificial element to cut the sacrificial element.

14. The method of claim 11, further comprising
  retracting the gripper assembly after the cutting operation has been completed to remove the sacrificial element.

* * * * *